J. P. CLEAL.
CASH REGISTER.
APPLICATION FILED FEB. 3, 1909.
1,128,409.
Patented Feb. 16, 1915.
5 SHEETS—SHEET 3.
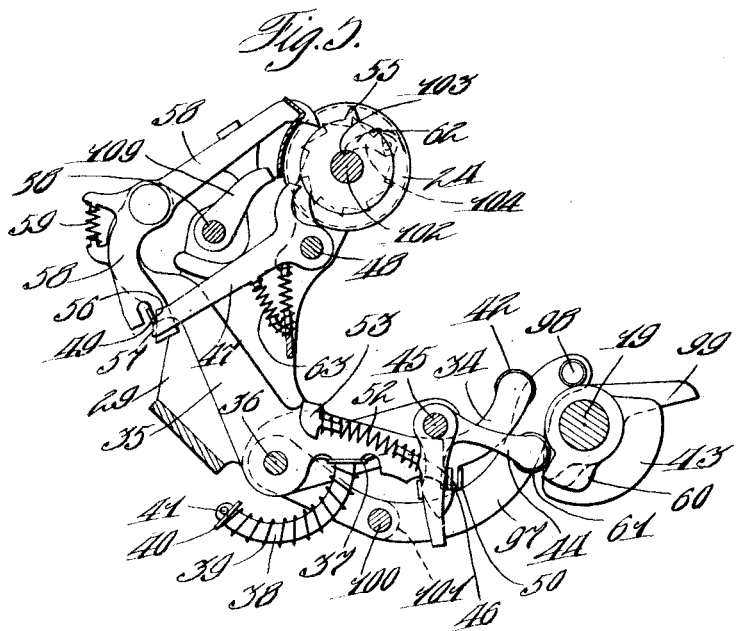
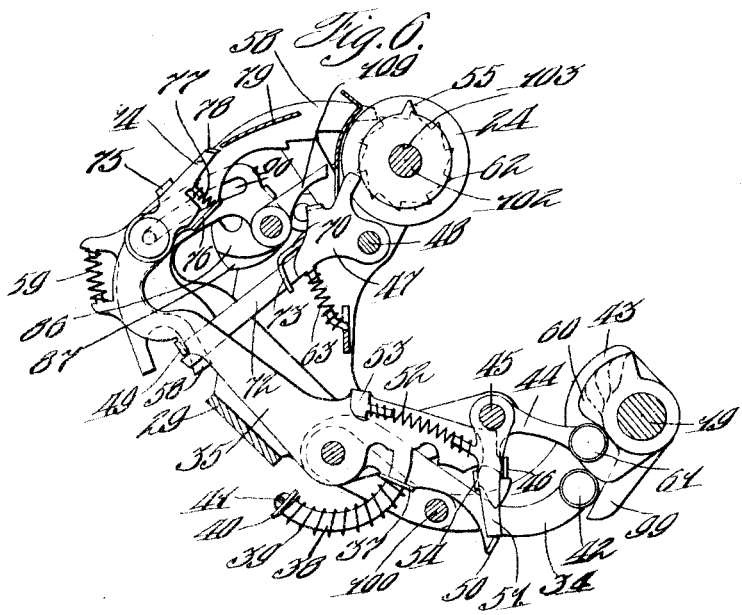

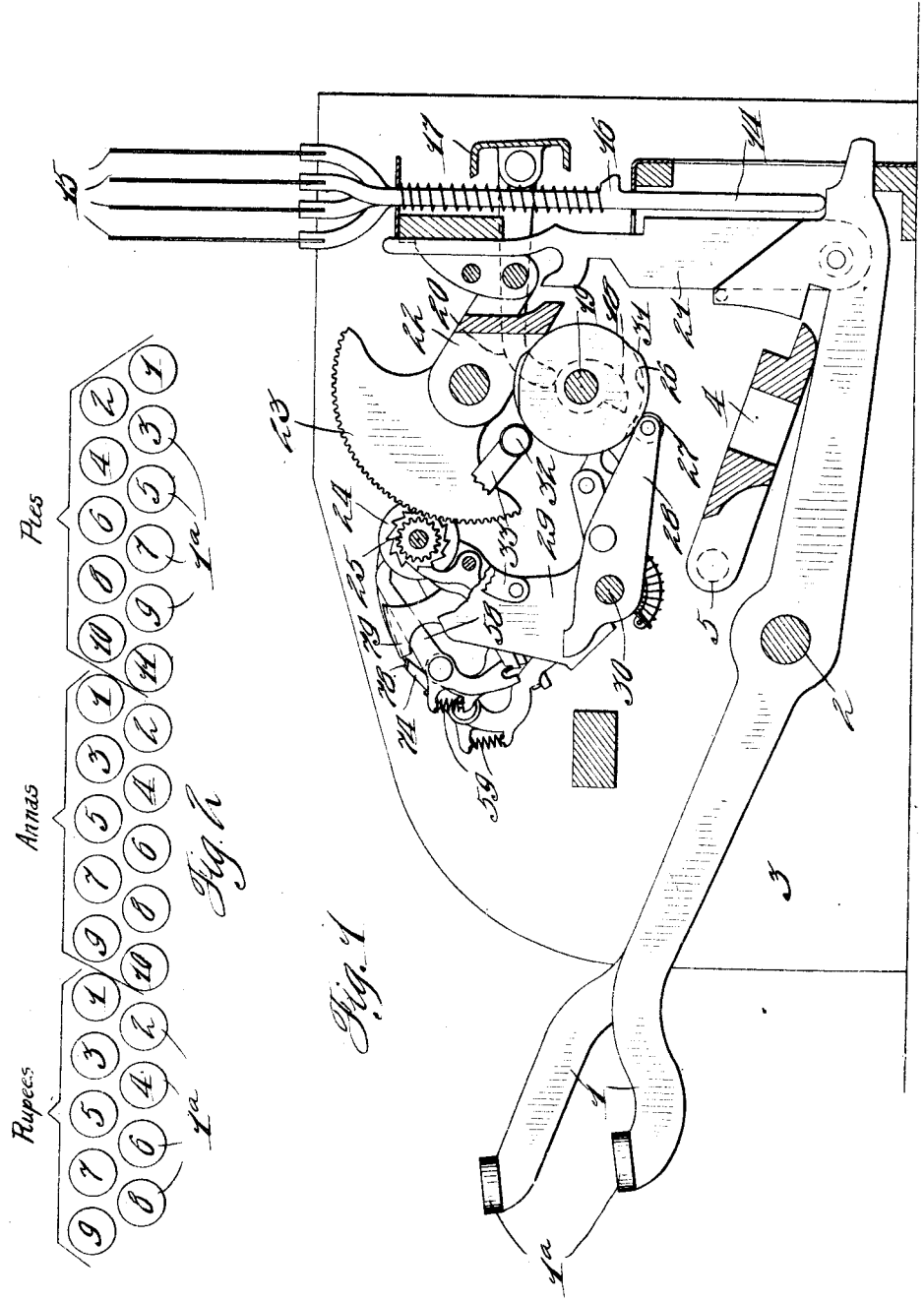

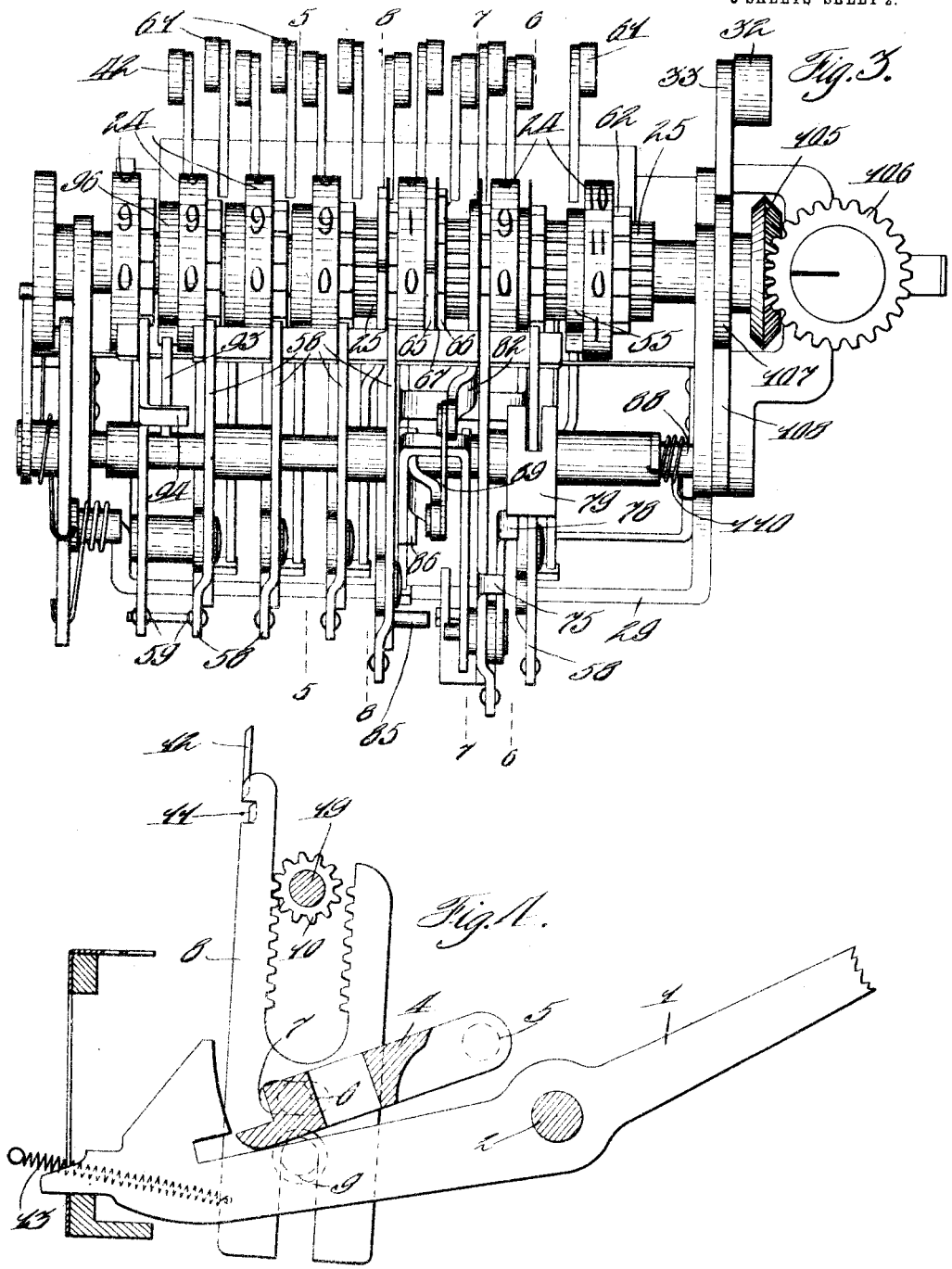

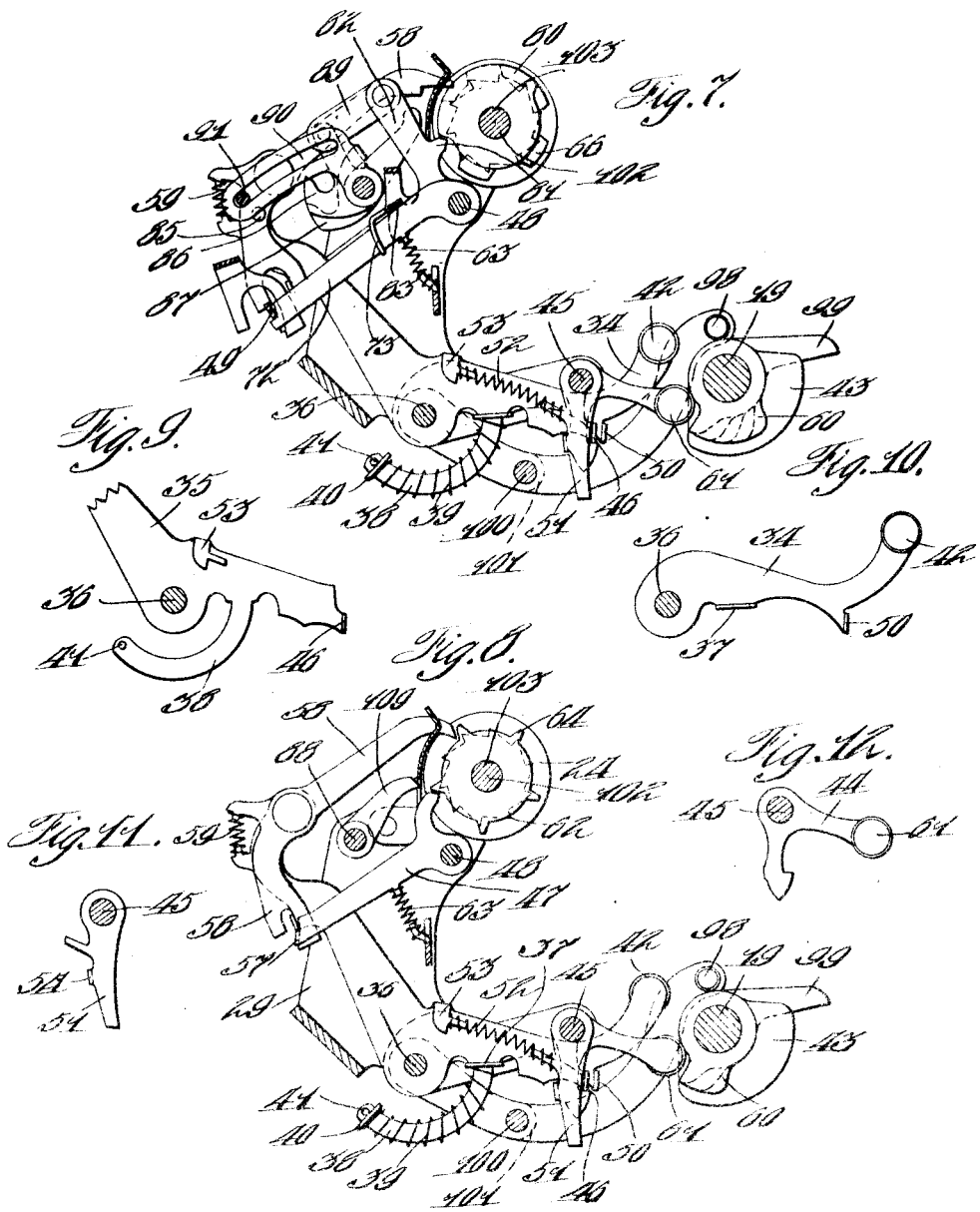

J. P. CLEAL.
CASH REGISTER.
APPLICATION FILED FEB. 3, 1909.
1,128,409.
Patented Feb. 16, 1915.
5 SHEETS—SHEET 5.
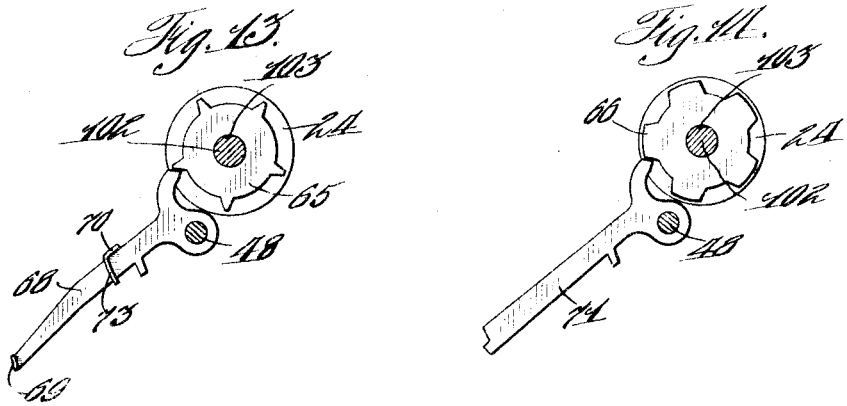
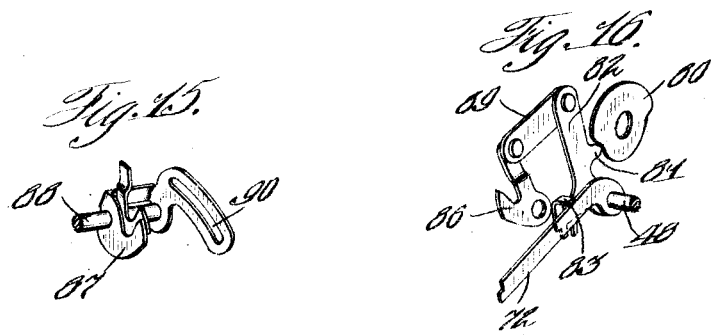
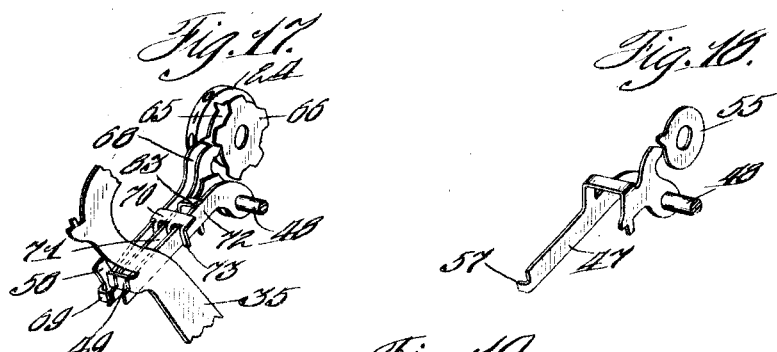
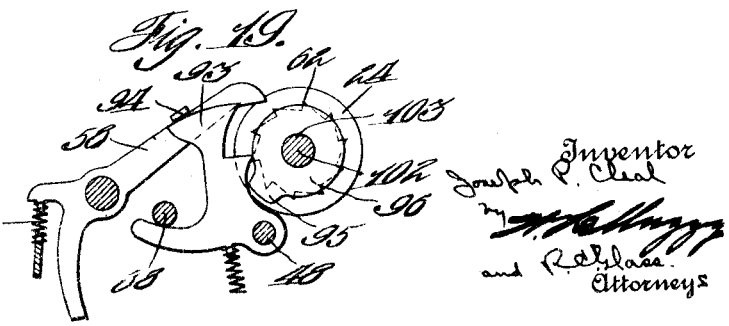

UNITED STATES PATENT OFFICE.

JOSEPH P. CLEAL, OF TORONTO, ONTARIO, CANADA, ASSIGNOR TO THE NATIONAL CASH REGISTER COMPANY, OF DAYTON, OHIO, A CORPORATION OF OHIO, (INCORPORATED IN 1906.)

CASH-REGISTER.

1,128,409.

Specification of Letters Patent. Patented Feb. 16, 1915.

Application filed February 3, 1909. Serial No. 475,862.

*To all whom it may concern:*

Be it known that I, JOSEPH P. CLEAL, a citizen of the United States, residing at Toronto, in the Province of Ontario, Canada, have invented certain new and useful Improvements in Cash-Registers, of which I declare the following to be a full, clear, and exact description.

This invention relates to improvements in accounting machines and has more relation to the registering mechanism for same.

The principal object of this invention is to provide an accounting machine with a totalizer having movable elements or registering wheels and transfer devices between said elements or wheels, the said transfer devices being controlled by the movable elements or wheels so as to transfer from an element or wheel of higher to lower denomination as well as from a lower to higher denomination.

Another object of the invention is to provide an improved transfer mechanism for the movable elements or wheels of a totalizer train in which power is stored by the operation of the machine, and the release of same being controlled by the movable elements or wheels and the further operation of the machine.

With these and incidental objects in view, the invention consists in certain novel features of construction and combinations of parts, the essential elements of which are set forth in appended claims and a preferred form of embodiment of which is hereinafter described with reference to the drawings which accompany and form part of this specification.

Of said drawings: Figure 1 represents a central transverse section through a type of machine shown in the patent granted to Thomas Carney, May 23, 1893, No. 497,860, with the invention applied thereto. Fig. 2 represents a top plan view of the different banks of key checks which are secured to the outer ends of the key levers. Fig. 3 represents a top plan view of the totalizer. Fig. 4 represents a partial transverse section through the machine showing the rack for rotating the main shaft. Figs. 5, 6, 7 and 8 represent transverse sections through the totalizer taken on lines 5—5, 6—6, 7—7, and 8—8 of Fig. 3. Figs. 9 to 19 inclusive represent detail views of different parts of the transfer mechanism.

The invention is designed for use in India, the monetary system of which, as is well known, is divided into pies, annas and rupees; twelve pies to an anna and sixteen annas to a rupee, rupees themselves being counted decimally.

Described in general terms the machine comprises a plurality of amount manipulative devices divided into banks representing pies, annas and rupees and provided at their rear ends with graduated uprights which actuate registering frames differentially. Upon the beginning of the movement of the manipulative devices, and before the registering frames are moved, a totalizer comprising a plurality of movable elements which is normally out of engagement with the frame is brought into engagement therewith and the movement of the frames imparted to the elements of the totalizer. The bank of anna manipulative devices or keys, which consists of ten keys, control two registering frames, the first nine keys imparting nine degrees of movement to one of the frames and the tenth key a single degree of the movement to the other frame. The movements of the frames controlled by the anna bank of keys are imparted to two of the movable elements or wheels of the totalizer train and suitable transfer devices are interposed between said wheels so that each wheel will control the transfer to the other as hereinafter fully described. It would, of course, be possible to use only one wheel or totalizer element for the anna denomination if the machine was to be designed primarily for Indian currency, but this invention is intended to adapt a well known machine for that currency, and the construction of the machine is such that it would be rather difficult to provide a totalizer element having the necessary sixteen divisions thereon. The teeth of the pinion for driving the element would necessarily be smaller and closer together so much so as to weaken the teeth and render them liable to damage. Moreover the transfer mechanism must be of necessity so constructed as to be tripped in one step of movement of the element of lower order and difficulty might be found in attempting to operate the transfer mechanism on so small an angular movement of the totalizer elements. To obviate this objection the present invention has been designed, employing two totalizer elements for the anna denomination, whereby wheels having ten divisions only may be used, as is customary in previous machines of this type.

The employment of two totalizer elements for one denomination with means whereby certain predetermined movements of both are necessary before the usual transfer to an element of higher order takes place, is believed to be broadly novel in this case. This construction necessitates means whereby one rotation of the units of anna wheel will not necessarily transfer to the rupee wheel unless a movement of the other anna wheel is also given.

The machine is arranged to transfer to the rupee when or after sixteen annas have been registered, but, inasmuch, as the units of annas wheel is provided with ten numbers, the totalizer would clearly indicate an incorrect amount if the transfer to the rupee wheel left the units of annas wheel undisturbed in view of the fact that the tens of annas wheel is provided with alternate ciphers and ones, so that the movement from one to a succeeding zero of the tens of annas wheel would leave the units of annas wheel exhibiting four units too small an amount. For this reason mechanism is provided whereby at each time a transfer to the rupee wheel takes place, the units of annas wheel will be given a multiple erasing movement amounting invariably to four units, thereby as it were, erasing the amount previously indicated on the units of annas wheel and substituting a new amount, which is invariably four units greater than the erased amount.

The tens of annas wheel is sometimes required to move one step by transfer from the units of annas wheel and sometimes two steps depending on the preceding operation of the machine. This result is attained by providing mechanism whereby the spring which drives the tens of annas wheel in its transfer movement is tensioned at each operation sufficiently to cause a two step movement, which will take place unless a blocking device is inserted in the path of the transfer elements, the blocking device being controlled by the units of annas wheel. At the proper conditions, this blocking device is in the path of the said transfer pawl and will obstruct it after it has been given one step of movement, but, under other conditions, the movement of the units of annas wheel will withdraw the blocking device from the path of the transfer element and permit it to be given its full two step movement, thereby moving the tens of annas wheel two steps. This two step movement occurs only when the tens of annas wheel stands at zero and never when it stands at one, so that two steps of movement would be given only from zero to the succeeding zero and never from one to the succeeding one. The necessity for this follows from the fact that the transfer occurs after sixteen annas have been added. If the tens of annas wheel stood at one, this would mean that ten units at least had been added and at the next operation no more than nine units could be added on the units wheel, making the sum total nineteen, but the transfer to the rupees wheel would reduce this number to three, which clearly would require a zero on the tens of annas wheel at the viewing point. On the other hand, if the annas wheels stood at zero, and nine were twice added, this would make eighteen, or, after the transfer to rupees had taken place, would leave two, in which case the tens of annas wheel should read zero, but this clearly requires a two step movement.

A general description of the machine of the Carney patent, as now on the market, will be first given and the mechanism of the present invention described afterward.

In the Carney machine the amount manipulative devices 1 are mounted upon a horizontal shaft 2 secured to the side frames 3 of the machine and are provided at their forward ends with key checks 1ª bearing numerals representing various amounts. Extending over all of the keys 1 and operated by any one of them is a universal bar or coupler 4, which is pivoted at 5 to the side frames 3. Projecting laterally from the bar or coupler 4 is a pin 6, which plays in an elongated slot 7 formed in a double rack bar 8. This bar at its lower end is bifurcated and straddles a pin 9 extending from one of the side frames 3, which acts as a guide when the rack bar 8 is reciprocated by the oscillatory movement of the coupler 4 imparted thereto by the keys 1. As the rack bar 8 is elevated by the downward movement of any of the keys 1, the teeth on the left hand portion of said bar will engage a pinion 10 and rotate the latter in a clockwise direction as shown in Fig. 4. This portion of the bar 8 is held in engagement with the pinion 9 during the upward movement of the bar by a lug 11 bent backward from it and engaging the forward side of a projection 12 extending inwardly from one of the side frames 3. As the key 1 reaches the limit of its downward movement the lug 11 passes above the projection 12 and is drawn to the rear thereof by a spring 13 which has passed above the pin 9, the latter acting as a pivot as well as a guide pin. By this movement of the rack bar 8 the teeth in the forward portion of said bar engage the pinion 10 and as the bar is moved downwardly and the key upwardly, the lug 11 will ride on the rear side of the projection 12, thereby holding the forward portion of the bar in engagement with the pinion 10 until the end of the upstroke of the key, when the spring will return the bar 8 to the position shown in Fig. 4.

Mounted upon the rear ends of the keys 1 are standards 14, which carry at their upper ends indicators 15 corresponding to the various denominations of the keys 1. Projecting rearwardly from each standard is a lug 16 arranged to be engaged on its under side by an oscillating supporting frame 17 to hold any of the elevated tablets in exposed position. This frame 17 is rocked upon each operation of the machine by a cam 18, secured to a shaft 19, to which is also secured the pinion 10, engaging an arm 20 projecting forwardly from the frame, see Figs. 1 and 4. Pivoted to the rear ends of the keys 1 are graduated uprights 21, only one being shown, which, when the keys are operated, impart differential movement to registering frames 22. The keys of the pie denomination of which there are eleven impart eleven degrees of movement to its corresponding registering frame 22 and by means of a segment 23 carried by said frame rotate a registering wheel 24 of the totalizer through a pinion 25 secured to said wheel. These pinions 25, of which there is one for each register frame 22 are normally out of engagement with the segments 23 and are brought into engagement therewith by means of a cam 26 secured to the shaft 19. This cam engages a roller 27 mounted upon one end of an arm 28 secured to a frame 29 in which the movable elements or registering wheels 24 of the totalizer are mounted. The frame 29 is pivotally mounted as at 30 and upon the beginning of movement of the frame 19, cam 26 engages the roller 27 and rocks the frame 29, thereby carrying the pinions 25 into engagement with the segments 23 before the registering frames 22 are acted upon by the uprights 21. Upon the beginning of the last half of rotation of the shaft 19 a cam 31 mounted thereon will engage with a roller 32 mounted upon the inner end of an arm 33, which is suitably mounted upon the totalizer frame 29 and rock said frame so as to disengage the pinions 25 from the segments 23 to allow the return of the registering frames 22 carrying said segments, all of which is fully shown and described in the previously mentioned Carney patent.

The first nine keys of the bank of anna keys impart a differential movement to a registering frame 22 in manner similar to that imparted by the keys of the pie bank to their corresponding frame, while the tenth key of the anna bank imparts a single degree of movement to its frame 22. The nine keys of the rupee bank actuate a registering frame 22 in a manner similar to the anna and pie keys.

Referring now to Figs. 5 to 18 inclusive, the transfer devices between the movable elements or wheels of the totalizer will be described.

It will be remembered that the transfer from annas to rupees takes place after sixteen annas have been added and, in view of the two wheels allotted to the annas denomination, certain novel mechanism has been designed whereby both of the wheels are required to control this transfer mechanism, and whereby a multiple erasing movement is given to the units of annas wheel each time the transfer to the rupee wheel takes place. The requisite sixteen annas to be added may be attained by adding successively on the units wheel or on the tens wheel or on both and in these different cases different mechanisms are requisite to effect the proper transfer. The numbers to be added may be obtained by successive actuations of the units wheel, as, for instance, when eight or nine units are added twice in succession. Under these circumstances no transfer effect is produced at the first movement, either of the tens of annas wheel or of the rupees wheel, but when the second eight annas are added, the mechanism will be tripped providing for a two step movement of the tens of annas wheel, which in its two step movement trips the transfer device properly for the rupee wheel and permits it to move one step. If the tens of annas wheel is operated twice in succession, it will then stand at the succeeding zero and in its movement from one to zero will trip the transfer for the rupee element. If eight units and ten units of annas are added successively, the first operation will cause no effect as far as transferring is concerned, but the movement of the tens of annas wheel from zero to one trips mechanism which permits the erasing movement of the units of annas wheel, which wheel, having previously stood at eight, would at this time be moved four steps so as to read two and then the condition is precisely the same as in the first example given, viz., that at the proper stage in the operation the units wheel has been given its multiple movement and the transfer device for the tens element has been tripped. This transfer when operated will move the tens of annas element to the succeeding zero, tripping the transfer for the rupee element. If the unit of annas wheel stands at six or more and ten annas are added by one step movement of the tens wheel, the condition then would be the same as obtained after the operation previously referred to, viz., mechanism permitting the multiple movement of the units wheel would be free and in its movement would release mechanism for giving the tens of annas wheel an extra step, thereby causing the tens of annas wheel to exhibit zero, this movement tripping the transfer for the rupees wheel, and permitting the rupees wheel to be moved an additional step.

The transfer from pie to annas is not different in principle from previously known transfer mechanism, which operate at every complete rotation of the pie wheel, though the construction is in itself novel. The rupees are counted decimally, and therefore no novelty of principle in their transfer mechanism is requisite.

With this general description, the principle of operation of the transfer mechanism will be clear and a specific statement of the construction may be given, it will be seen that these transfer devices comprise two part levers with springs interposed between said parts. Upon each operation of the machine the springs are first compressed and then successively released to effect a transfer when one is to be made.

The parts 34 and 35, which form one of the transfer levers are pivoted upon a shaft 36 supported by the side walls of the totalizer frame 29. The part 34 of each transfer lever is provided with a lateral extension 37 through which passes a curved arm 38 formed upon the part 35. A spring 39 surrounds the arm 38, the ends of which abut against the extension 37 of the part 34, and a collar 40 upon the end of the arm 38, the said collar being prevented from slipping off said arm by a pin 41. The extreme end of each one of the parts 34 is provided with an anti-friction roller 42, which is engaged by a cam 43 secured to the rotation shaft 19 upon the first half of rotation of said shaft and rock the part 34 about its pivotal point thereby compressing spring 39, the other part 35 of the transfer lever being held against movement by a bell crank pawl 44 pivoted upon a rod 45 engaging a bent portion 46, and by a retaining transfer trip pawl 47 mounted upon a rod 48 which engages a bent portion 49 of said part 35. The rods 45 and 48 are supported by the side walls of the totalizer frame 29. The part 34 of each transfer lever is provided with a second lateral extension 50 with which a pawl 51 engages when the said part is in depressed position, as shown in Fig. 6. A spring 52 is interposed between the pawl 51 and an ear 53 formed upon the part 35 of the transfer lever so as to keep said pawl in a position to snap over the extension 50 of the part 34 when the latter is depressed. This pawl 51 is provided with a laterally extending lug 54 which abuts against the rear end of the downwardly extending portion of the bell crank pawl 44 thereby holding said pawl in engagement with the extension 46 of the part 35 of the transfer lever.

As the pie wheel 24 moves from the eleventh to the twelfth position a single tooth cam carried thereby similar to the cam 55 shown in Fig. 5, rocks the tripping pawl 47, thereby carrying a shoulder 56 formed on said pawl from out of engagement with the bent portion 49 of the part 35. This pawl will be latched in its rocked position by a laterally projecting lug 57 formed thereon passing under the lower end of a transfer pawl 58, which is pivotally mounted upon the upper end of the part 35, and held in the position shown in Fig. 5 by a coil spring 59 interposed between projections of the pawl 58 and part 35. A series of helically arranged cams 60 one for each pawl 44, secured to the rotation shaft 19 and successively engage with rollers 61 carried by the rear ends of the pawls 44. When the pawl 44 holding the part 35 of the transfer lever controlled by the pie wheel is released, the said part 35 carrying the transfer pawl 58 will be operated by means of the spring 39, which has been previously put under tension as hereinbefore described, it being understood that the tripping pawl 47 is also held in unlatched position by the tail of the transfer pawl 58. As the part 35 carrying the pawl 58 is operated by the spring 39, the pawl 58 will engage with a tooth of a ratchet wheel 62 secured to the units of annas wheel and move the latter one space, it being understood that the above described mechanism is brought into operation upon the last half of rotation of the shaft 19 after the totalizer is disengaged from the registering frames. The tripping of the bell crank pawl 44 by its corresponding cam 60 also trips the pawl 51 because of the lug 54 carried by the latter being in position to be struck by the downward extension of the pawl 44, thereby carrying the lower end of the pawl 51 from out of engagement with the extension 50 of part 34 of the transfer lever. This lever 34 would have a tendency to return to normal position under stress of spring 39 and thereby to destroy the effectiveness of said spring in driving the part 35 after the pawl had been rocked out of engagement with the extension 51, but by the shape of the cam 43, the part 34 is held in its depressed position until near the end of rotation of the shaft 19. As the transfer is being effected, the tail of the transfer pawl 58 passes out of engagement with the lug 57 of the retaining pawl 47 and the latter is forced upwardly by a spring 63 until the upper side of said pawl contacts with the bent portion 49 of the part 35 of the transfer lever. As the latter part is returned to normal position by means hereinafter described, the bent portion 49 will pass over the shoulder 56 of the pawl 47 and the latter will be forced farther upwardly by its spring 63 so that the bent portion 49 will be engaged by the said shoulder 56 thereby preventing further operation of the part 35 until the pawl 47 is again tripped.

As previously described, the keys of the anna bank control two of the movable elements or wheels 24 of the totalizer train, namely, the second and third wheels from the right in Fig. 3, upon which are registered the units and tens of annas respectively. The units of annas wheel is provided with ten numerals reading from zero to nine and has fast to it a single tooth transfer disk similar to the disk 55, secured to the pie wheel which trips the transfer mechanism for the tens of annas wheel upon each revolution of said units wheel in a manner similar to the transfer mechanism for the units of annas wheel tripped by the pie wheel. The tens of annas wheel is provided with five zeros and five ones arranged alternately. Secured to this wheel is a five tooth disk 64, see Fig. 8, the teeth of which trip the transfer mechanism for the units of rupees wheel each time one of the zeros of the tens of annas wheel appears at the reading point, in a manner similar to the transfer mechanism previously described.

Referring to Fig. 6, it will be seen that the transfer lever which effects the erasing movement is of the same general construction as the levers heretofore described, consisting of the two parts 34 and 35 and a transfer pawl 58. This pawl differs from the ones previously described in that it is provided with four teeth instead of one, whereby the units of annas wheel may be given a four step movement.

Suitably secured to the right hand side of the tens of annas wheel, see Figs. 3 and 17, are two five point disks 65 and 66 separated by a thin metal disk 67, the latter being left off of Fig. 17 for clearness sake. The teeth of the disk 66 are wider than the teeth of disk 65 for a purpose hereinafter described. When the tens of annas wheel passes from one to zero, one of the teeth of the disk 65 will engage with a pawl 68 and rock it about a rod 48 until a lateral extension 69 formed upon the forward end of said pawl passes under the downward extension of the transfer pawl 58 in which position it is latched by said pawl. An arm 70 extends laterally from the pawl 68, passes above two retaining pawls 71 and 72, and is provided with downwardly extending fingers 73 which prevent lateral displacement of the pawls 71 and 72, the latter being mounted upon the rod 48. As the pawl 68 is rocked as previously described, the arm 70 projecting therefrom will engage and rock the retaining pawls 71 and 72, thereby permitting the part 35 of the transfer lever carrying the pawl 58, see Fig. 6, to move rearwardly by means of its spring 39 when the other retaining pawl 44 is tripped by its cam 60 secured to the rotation shaft 19.

The pawl 58, as previously described, is provided with four teeth so that upon its rearward movement it will rotate the units of annas wheel four steps. Pivoted to the upper end of the part 35 carrying the four tooth transfer pawl 58, is a pawl 74 which plays between two lugs 75 and 76 projecting from the pawl 58. This pawl 74 is normally held with the upper side thereof in contact with the lug 75 by a spring 77 interposed between the free end of the pawl and the lug 76. This pawl 74 at its extreme free end is provided with a lateral projection 78, which engages the underside of a flange 79, Figs. 3 and 6, of an upright suitably mounted within the totalizer frame when the part 35 of the transfer lever carrying the four tooth pawl 58 moves rearwardly. The projection 78 of the pawl 74 strikes the flange 79 at an angle when the pawl is moved rearwardly forcing the bottom of the pawl into engagement with the lug 76 of the transfer pawl 58, thereby holding the latter into engagement with its ratchet wheel 62 during the rearward movement so as to prevent an overthrow of the units of annas wheel. As the parts are returned by means hereinafter described, the projection 78 of the pawl 74 rides upon the upper side of the flange 79, lifts the transfer pawl out of engagement with its ratchet wheel by contacting with the lug 75 of the transfer pawl. The retaining pawls 71 and 72 are also controlled by the tens and units of annas wheels respectively in the following manner: Secured to the units of annas wheel is a disk 80, see Figs. 3 and 16, having a reduced portion six-tenths of its circumference. As the numeral six on the units of annas wheel appears at the reading point, the enlarged portion of the disk 80 will engage a projection 81 of an arm 82 pivotally mounted upon the rod 48 and rock same forwardly. A portion of this arm 82 projects forwardly and has extending laterally therefrom a lug 83, which lies above this retaining pawl 72. As the arm 82 is rocked forwardly by the disk 80, the lug 83 will engage the upper side of the retaining pawl 72 and carry the shoulder formed upon the forward side of the latter from out of the path of the lug 49 of the part 35 of the transfer lever carrying the four tooth transfer pawl 58. Now, if the tens of annas wheel is rotated to bring the numeral one to the reading point, one of the wide teeth of the cam disk 66 will engage the retaining pawl 71 and carry the shoulder formed on the front end thereof out of the path of the lug 49 of the part 35. Upon the release of the bell crank pawl 44 by its cam 60, the part 35 of the transfer lever carrying the four tooth pawl 58 will spring forward and rotate the units of annas wheel to bring zero to the reading point. As this is done the single tooth disk 55 carried by the units of annas wheel will trip the transfer mechanism for the tens of annas wheel, and as this is turned in the transfer mechanism to the units of rupees wheel will be tripped to actuate the latter wheel a single space as previously described.

The retaining pawl 72 is held out of engagement with the lug 49 while the numerals 6 to 9 of the units of annas wheel pass the reading point. Springs similar to springs 63 keep the pawls 68, 71 and 72 and arm 82 in operative position. The retaining pawl 47 of the tens of annas wheels transfer mechanism, which is actuated by the single tooth disk 55 of the units of annas wheel, is of the shape shown in Fig. 18 so as to straddle the four tooth transfer mechanism for the units of annas wheel.

It will be seen from the foregoing description that the necessities of the transfer from annas to rupees are well met by this construction. If the units of annas wheel is operated a number of times in succession, the sum total of the additions being more than nine but less than sixteen, a transfer of one unit will be given to the tens of annas wheel. If, however, the units of annas wheel stands at nine and enough is added to fit it to equal or exceed sixteen a transfer to the rupee wheel should be the ultimate result. This is provided for by the construction described, inasmuch as the movement of the units of annas wheel through zero trips the transfer for the tens of annas wheel which may then be moved forwardly one step. This one step movement as indicated on Fig. 17 withdraws the holding device from the mechanism giving the multiple erasing movement previously referred to, and this takes place thereby advancing the units of annas wheel four steps, and at the same time permitting an additional step of movement making two steps in all of the tens of annas wheel, the latter of these steps of movement tripping the transfer to the rupees wheel and permitting it to move one step. If the units of annas wheel stands at a number greater than six and ten annas are added, giving one step of movement to the tens of annas wheel, the transfer to the rupees wheel is tripped and the holding device for the multiple mechanism of the units of annas wheel is also tripped so that the rupees wheel will be given one step of movement and the units of annas wheel four steps of movement. These four steps of movement will trip the transfer for the tens of annas wheel so that an additional step of movement will be given to it, thereby bringing the succeeding zero to the viewing point. The other possible combinations may be easily seen, but in all cases provide for a correct transfer, and it will be seen that each time the transfer to the wheel of higher order, viz., the rupee wheel takes place, the multiple erasing movement will be given to the units of annas wheel.

The transfer lever for the tens of annas wheel is constructed to have a differential movement, that is, on some occasions it advances the wheel a single space while on others it advances the wheel two spaces as will now be described. This construction is rendered necessary because of the non-decimal denominational ratio of the machine. It was pointed out in some of the previous examples, that a transfer to the rupees wheel might be necessary by movement of the units of annas wheel without any movement of the tens of annas wheel. If the tens of units of annas wheel stands at zero and sixteen units of annas are successively added on the annas wheel, it being assumed that the last operation carries the units of annas wheel from nine or less to six or more, then under these conditions, the tens of annas wheel should be given two steps of movement to bring it again to zero. On the other hand, if the sum total of sixteen is made by a step or movement of the tens of annas wheel, due to pressing of the corresponding key, then one of the two steps from zero to the succeeding zero will have been given and the transfer mechanism need only move the tens of annas wheel one additional step. These results are attained by the use of two blocking devices which will, either of them, prevent more than one step of movement being given to the tens of annas wheel. One of these devices is normally in the path of a projection on the transfer element for the tens wheel and is moved out of its path by the units wheel when it stands at any number from six to nine inclusive. The other of the blocking devices is normally out of the path of the tens of annas transfer arm, but, is moved into such path by the multiple erasing mechanism during the last step of its movement. If either one of these blocking elements is in the path of the tens of annas transfer lever, its movement will be restricted to one step, while if both of the elements are out of its path, its movement will then include two steps.

The transfer pawl 58 pivoted to the part 35 of the tens of annas wheel transfer mechanism is provided with a laterally extending pin 85, see Figs. 3 and 7, which, as the pawl moves rearwardly on some occasions, contacts with one or the other of two arms 86 and 87, see Figs. 3, 7, 15 and 16 mounted upon a rod 88 suitably supported by the totalizer frame 29 thereby moving the tens of annas wheel only a single step, while on other occasions this pin 85 clears the arms 86 and 87 and permits the advancement of said wheel two steps by the pawl 58. The arm 86 is connected to the arm 82 by a link 89, see Fig. 16, and while any of the numerals from zero to five inclusive of the units of annas wheel is at the reading point, the arm 86 will be in a position to intercept the pin 85 thereby limiting the movement of the tens of annas transfer mechanism to a single step. While the enlarged portion of the disk 80 is in engagement with the projection 81 of the arms 82, the arm 80 will be rocked out of the path of the pin 85, so that the transfer pawl 58 carrying the pin 85 may advance two steps as far as the arm 86 is concerned.

The arm 87 is mounted upon the rod 88 as previously described, and is of a yoke formation, one portion of which is provided with an elongated slot 90, see Figs. 6, 7, and 15, through which a pin 91 projecting from the four tooth transfer pawl 58 plays. It will be seen that the arms 86 and 87 provide successfully for controlling the transfer movements of the tens of annas lever. The arm 86 is normally in the path of pin 85, thereby preventing more than one step of movement, but if the units of annas wheel stands at six or over, the arm 86 is then out of the path of pin 85 and a two step movement may be given to the transfer lever as far as arm 86 is concerned. It might be, however, that only six are registered, and in this case two steps of movement should not be given to the tens of annas wheel, and, for this reason, the arm 87 is provided. Assume for instance, that the units of annas wheel moves from five to zero, that is, is given an addition of five steps. Under these circumstances the arm 86 would be moved out of the path of pin 85, while the units wheel was passing from six to nine, but would again be moved into the path of pin 85 when the units wheel reaches zero. Clearly at this time a transfer should take place to the tens of annas wheel, but only one step of movement should be permitted, and this is accomplished by the arm 86. Assume, however, that the two annas wheels stand at one and five respectively, indicating 15 units, and that seven is then added to the units of annas wheel. The conditions as far as the units of annas wheel are concerned are the same as in the preceding case, the annas wheel then standing at two and the tens wheel remaining at one. Clearly, however, this then indicates twelve, or with a transfer to the tens of annas wheel indicates two, whereas it should be six after taking sixteen, which is accounted for by the transfer to rupees. When the annas wheel is moved by the erasing mechanism from two to six, the arm 86 would then be carried out of the path of pin 85; as far as the arm 86 is concerned, the tens of annas wheel could then be given two steps of movement, but this would be clearly wrong, inasmuch as only one step should be given to move the tens wheel from one to the succeeding zero and therefore the arm 87 is provided which is only moved into the path of pin 85 at the last step of movement of the erasing mechanism. Under the conditions of the example just given, the arm 87 would prevent more than the necessary one step of movement of the tens of annas wheel, thereby supplementing the arm 86. If the tens of annas wheel stands at zero and the units of annas wheel stands at say nine, and seven at least more are added, a transfer to the rupees should take place and the tens of annas wheel should be moved two steps. Under the conditions of this example, the arm 86 is moved out of the path of pin 85 when the units of annas wheel reaches the six position, but as the units of annas wheel passes from nine through zero, the holding pawl of the tens of annas wheel is released and the transfer may then go in at a slightly earlier part of the operation than in the preceding example. Under these circumstances the tens of annas transfer lever moves forwardly one step during the time the erasing mechanism is moved forward its four steps, so that pin 85 passes the point at which it would be blocked by arm 87 if the operation of pin 85 was delayed, so that, although the arm 87 is moved at the last step of movement of the erasing mechanism, it does not reach blocking position until after the pin 85 has moved past the blocking position, thereby giving the tens of annas wheel two steps of movement and causing it to reach the next zero position. The following example illustrates how the arm 86 is rocked out and the arm 87 in the path of the pin 85.

Assume that fifteen annas have been registered and it is desired to register eight more. The units of annas wheels would be rotated until the numeral 3 appeared at the reading point. As the numeral 9 passes the reading point, the single tooth disk 55 carried by said wheel trips the retaining pawl 47 of the tens of annas transfer mechanism, Figs. 6 and 18. As the part 35 carrying the two tooth transfer pawl of the latter mechanism moves rearwardly, the pin 85 will contact with the arm 86 thereby limiting the advancement of the tens of annas wheel one space or from one to zero. As this wheel moves from one to zero, one of the teeth of the five tooth disk 65, see Fig. 17, carried by this wheel will rock the pawl 68 and by the arm 70 extending therefrom carry the retaining pawls 71 and 72 with it, thereby allowing the part 35 carrying the four tooth pawl 58 to spring rearwardly and rotate the units of annas wheel to bring the numeral seven to the reading point. The elongated slot 90 of the yoke arm 87, see Figs. 6, 7, and 15, through which the pin 91 carried by the four tooth transfer pawl 58 plays, is eccentric to the movement of said pin, so that as the pawl carrying the pin moves rearwardly, the arm 87 will be raised in the path of the pin 85 of the tens of annas wheel, while the arm 86 will be rocked out of the path of said pin by the enlarged portion of the disk 80, Figs. 6 and 16, engaging the projection 81 of the arm 82, which is connected to the arm 86 by the link 89.

It will be seen from the examples thus given that there are two wheels of the annas denomination for tens and units of annas respectively, and that it is only these two wheels which are concerned with the multiple erasing movement. The transfer from the tens of annas wheel to the units of rupees wheel is entirely regular, though it occurs in connection with each two steps of movement of the tens of annas wheel and not after each complete rotation only. To cause this transfer to units of rupees, Fig. 8 shows a transfer trip element having five trip teeth. The transfer from the units of annas to the tens of annas wheel trips at each complete rotation of the units wheel whether this complete rotation is caused directly by the actuating device, or is caused by the multiple erasing movement. Therefore, the transfer device from units to tens of annas may be tripped twice in the same operation. For example, the units of annas wheel might stand at "nine" and have "eight" added thereto. In such a case the transfer device for the tens of annas wheel would be tripped at the first step of movement of the units wheel. During the transferring part of the operation, the multiple erasing movement to the units of annas wheel would move it from the position indicating "seven" to the position indicating "one," thus again tripping the transfer device to the tens of annas wheel. However, this operation is entirely proper and is necessary to obtain correct results in all cases. Thus this multiple erasing movement is given every time the tens of annas wheel transfers to the units of rupees wheel, or, in other words, every time sixteen annas or more are registered on either or both of the annas wheels. A brief consideration of the mathematical side of the problem will indicate that this multiple erasing movement must be given at every such operation. From a mathematical standpoint, the operation of any transferring device is the equivalent of the subtraction from the reading of the wheel causing the transfer, of such a number of its units as make up one unit of the next higher wheel, the wheel transferred to. In the ordinary "one to ten" transfer, the wheels have ten numbers thereon and at the end of a complete rotation, instead of indicating "ten" any particular wheel will indicate "zero," and the next higher wheel will move one step. Thus, instead of indicating "ten" as it should, the lower wheel has ten units subtracted from its true reading, but to keep the correct account these units are added by a one step movement of the next higher wheel. In such a case no erasing movement of the lower wheel is necessary for the reason that the ratio of transfer is the same as the number of steps on the wheel, namely, ten.

In the transfer of the present application, the decimal ratio does not obtain, although the number of wheel steps is still ten. However, the mathematical theory of the transfer must be the same as in all other machines. That is, the operation of the transfer device must at each transfer be accompanied by the subtraction from the lower wheel reading of a number of units equal to one step of the next higher wheel. In this application the number of units of movement of the lower wheel equivalent to one unit of movement of the higher wheel is sixteen and therefore, at every transfer operation sixteen units must be subtracted from the reading of the lower or annas wheels. However, as the tens of annas wheel can move only in integral steps, and therefore, cannot subtract any number of annas except ten or twenty, it cannot by itself subtract sixteen annas when the rupees wheel adds sixteen annas by moving one step. What happens is that the tens of annas wheel subtracts twenty annas, whereupon four must be added some place to maintain the correct account. It is said that twenty annas are subtracted by a transfer to the rupees wheel. This clearly follows from the fact that two steps of movement of the tens of annas wheel are given for each transferring operation to the units of rupees wheel, and it is true that twenty annas are subtracted in spite of the fact that the wheel has alternate ciphers and ones. If the tens of annas wheel stands at zero position and is moved two steps, then it should indicate twenty, but instead it indicates "zero" again, and of those twenty annas which are subtracted from its reading by the second step of movement of the tens of annas wheel, sixteen are added on the units of rupees wheel by the one step movement thereof and the other four must in all cases be added to the units of annas wheel. This theoretical statement shows clearly that in all cases, wherever a transfer to the units of rupees wheel takes place, a multiple erasing addition movement of four steps must be given the units of annas wheel. It may be added that in theory the subtraction of sixteen from the true reading of the annas wheels might be obtained by a subtraction of ten from the tens of annas wheel and an additional subtraction of six from the units of annas wheel. That is, instead of moving the units wheel four steps forward, it might be moved six steps backward, though this would necessitate other changes. The method disclosed by the drawings, of subtracting twenty from the tens of annas reading and adding four to the units of annas reading is deemed preferable, but in either case the net result is that sixteen is subtracted from the annas reading and its equivalent is added to the reading of the rupees wheel.

As a further example it may be well to outline a case where both of the arms 86 and 87 are withdrawn to permit two steps of movement of the tens of annas wheel at a single operation of the machine. Assume therefore, that both the annas wheels indicate zero, and that then eight annas are registered twice in succession. The result of these two operations, then, must be that one is added to the rupees wheel and that both annas wheels again indicate zero, inasmuch as adding eight annas twice or sixteen annas is the same as adding one rupee. The operation of adding the first eight annas will be readily understood, and as the second eight annas is registered, the transfer device will be operated. During the second step of the second movement of the units of annas wheel, the regular transfer to the tens of annas wheel will be released and during the last step of movement of the annas wheel, that is, the step when its indication changes from five to six indicating a total addition of sixteen, the enlarged portion of the disk 80, Fig. 16, will engage the link 82 thus depressing the stopping arm 86 and the trip pawl 72. Therefore at the end of the direct addition, the depression of trip pawl 72 partly releases the arm 35, Fig. 17, which causes the multiple erasing movement, and the stopping arms 86 and 87 are both out of the path of movement of the transfer device for the tens of annas wheel. However, the transfer latch 71, Fig. 17, still holds the arm 35. When the transfer devices are released in succession and operate, the multiple erasing movement will not be immediately given, but the transfer device for the tens of annas wheel will move this wheel forward two steps, that is, from the position indicating one of its zeros to the next zero position. During the first of these two movements, the disk 66, Figs. 14 and 17, engages and depresses the transfer trip pawl 71, whereby the arm 35, controlling the multiple erasing movement is entirely released. This arm then moves forward immediately giving four additional steps of movement of the units of annas wheel, thereby changing its indication from six to zero and again tripping the transfer pawl for the tens of annas wheel. Meanwhile the two step transfer device of Fig. 7, moves the tens of annas wheel forward, the second step tripping the regular transfer for the units of rupees wheel. It will be understood that although the transfer for this tens of annas wheel has been tripped a second time, no cumulative effect is thereby produced, as the device cannot throw the tens of annas wheel more than two steps. Thus, at the end of the operation, the units of rupees wheel has been moved one step by this transfer device and both the tens and units of annas wheels stand again at zero positions. Of course, the last step of movement of the units of annas wheel at its multiple erasing movement, carries the wheel from its nine to its zero indicating position. Thereby the reduced portion of disk 80, Fig. 16, engages the arm 82 and permits the stopping projection 86 to move upward to its stopping position. At this last step of movement, also, the erasing device causes the elevation of the other projection 87 through the movement of pawl 85 in slot 90, Fig. 15. However, both of these movements are too late to prevent the second step of movement of the tens of annas transfer device, which has already occurred. To permit such an operation both the arms 86 and 87 are cut away so that they may be elevated whether the pin 85 has been moved or not.

The transfers from the units to the tens and from the tens to the hundreds of rupees wheels are similar to the transfer from the pie to the units of annas wheel, that is, upon each rotation of the wheel of lower order the transfer mechanism for the wheel of the next higher order is tripped. The transfer pawl 58 for the last or thousands of rupees wheel is connected to the part 35 of the transfer lever carrying the transfer pawl 58 for the hundreds of rupees wheel so as to operate simultaneously with the latter pawl. This transfer pawl 58 for the thousands of rupees wheel although moved rearwardly with the hundreds of rupees transfer pawl is held out of engagement with its ratchet wheel 62 until a transfer is to be made to the thousands of rupees wheel by a spring pressed arm 93, see Figs. 3 and 19, pivotally mounted upon the rod 48. When no transfer is to be made to the thousands of rupees wheel a projection 94 extending laterally from the transfer pawl 58 for this wheel rests upon the upper side of the arm 93 and is thereby prevented from engaging the teeth of its ratchet wheel 62 as it is moved rearwardly. When the hundreds of rupees wheel appears with numeral 9 at the reading point, an enlarged portion 95 of a disk 96 secured to said wheel will engage the arm 93 and rock the latter so that the pawl 58 of the thousands of rupees wheel will engage the teeth of the ratchet wheel 62 carried by said rupee wheel when carried rearwardly with the transfer pawl of the hundreds of rupees wheel, it being understood that said pawls are only moved rearwardly when the retaining pawl 47 and the bell crank pawl 44 are tripped by the single tooth disk 55 of the tens of rupees wheel and one of the cams 60 secured to the rotation shaft 19 respectively. As seen by reference to Figs. 5, 6, 7 and 8, the shape of the cams 60 is such that while they trip the pawls 44 successively, the latter are only allowed to return to normal position after all of said pawls have been tripped. This releasing of the pawls 44 occurs just after the cams 43 pass beyond the rollers 42 carried by the parts 34 of the different transfer levers. After the springs 39 have been compressed and then released by the tripping of the pawls 44 and 47, there is enough tension left in said springs to move the parts 34 of the transfer levers slightly toward normal position when they are released by the cams 43, which insures the passing of the lugs 50 of the parts 34 above the lower ends of the pawls 51 so as to prevent the relatching of the parts 34 by the pawls 51 after the latter are released.

The parts 35 of the transfer levers are positively returned to normal position upon the beginning of rotation of the shaft 19 by the following described mechanism: Referring to Figs. 5, 6, 7 and 8 it will be seen that the forward end of an arm 97 is pivoted upon the shaft 36, while its rear end is provided with an anti-friction roller 98 which normally rests upon a sleeve secured to the rotation shaft 19. This sleeve is provided with a cam finger 99, which upon the beginning of rotation of the shaft 19 engages the roller 98 and elevates the arm 97 with the shaft 36 acting as a pivotal point. As this arm 97 is elevated a rod 100 extending under the rearward extensions of all of the parts 35, and being supported at its ends by the arm 97 and a short arm 101 shown in dotted lines and mounted upon the shaft 36 at the opposite side of the totalizer frame from the arm 97, is also carried upwardly. Upon the upward movement of the rod 100 it will engage with the underside of the released parts 35, and return them to normal position and by means of the springs 39 interposed between the parts 35 and 34 also bring the latter to normal position. Immediately after the parts 34 and 35 are returned the cam finger 99 passes beyond the roller 98 allowing the frame comprising the arms 97 and 101 and the rod 100 to drop by gravity to its normal position after which the cams 43 will engage the roller 42 of the parts 34 and depress the latter against the tension of springs 39 in which position they will be latched by the pawls 51. As the shaft continues its rotation these pawls will be successively tripped by the cams 60 as previously described.

The movable elements or registering wheels 24 of the totalizer are mounted upon a shaft 102, which is provided with a longitudinal groove 103 that engages with spring pressed pawls 104 carried by the wheels as said shaft is rotated, thereby returning the wheels to zero as is described in said Carney patent and well known in the art. This shaft 102 has secured to its right hand end a bevel gear 105, which meshes with a similar gear 106, see Fig. 3, so that a rotation of the latter will rotate the shaft 102. The gear 106 is under the control of a lock and key as is well known in the art. The shaft 102 is also provided near its right hand end with a disk 107 having a notch (not shown) in which plays one end of a pawl 108, the other end of which is secured to the shaft 88. Secured to this shaft 88 are arms 109, one for each transfer pawl 58 and which lie directly beneath said transfer pawls. When the shaft 102 is rotated by the above described gearing the disk 107 through pawl 108 will rock the shaft 88 carrying the arms 109, so that the latter will engage and slightly raise the pawls 58. By this means the tails of the pawls 58 will be held out of the path of the retaining pawls 47 so that the latter may be returned to normal position, after being tripped by the different cam disks carried by the wheels 24 during the rotation of the latter. At the end of the rotation of the disk 107 the pawl 108 will be rocked into the notch of said disk by a spring 110 surrounding the shaft 88, the ends of which abut against a portion of the totalizer frame and an arm 111 of a sleeve 112 secured to said shaft 88. This principle of preventing the tripping of the transfer pawls is old and well known in the art.

With the above description and examples given, it is believed the invention is fully described and a résumé of its operation need not be given.

It will be seen that the mechanism as described, is adapted to carry out the objects stated; it provides a totalizer having two elements allotted to the same denomination, and means for transferring to the rupees element only when 16 annas have been added, though the addition may take place on either of the annas wheels or on both. It is believed to be novel in the art to provide a construction having two totalizer elements of lower and higher orders, with means for automatically giving a multiple erasing movement to one of said elements of lower order each time a predetermined value has been added to two of the elements. The construction is adapted for other currency besides the Indian currency, for which it has been primarily designed, it being useful in any case where non-decimal denominational ratios of value are employed.

While the form of mechanism herein shown and described is admirably adapted to fulfil the objec :: primarily stated, it is to be understood that it is not intended to confine the invention to the one form of embodiment herein disclosed, for it is susceptible of embodiment in various forms, all coming within the scope of the claims which follow.

What is claimed is:

1. In a totalizer, the combination with a plurality of movable elements, of actuating means therefor, and means controlled by each of said elements for separately operating the other.

2. In a totalizer, the combination with a plurality of movable elements, of actuating means therefor, and spring controlled means governed by each of said elements for separately operating the other.

3. In a totalizer, the combination with a plurality of registering wheels, of actuating means therefor, and means controlled by each of said wheels for separately operating the other.

4. In a totalizer, the combination with a plurality of registering wheels, of manipulative devices and connections for actuating the same, and means controlled by each of said wheels for giving the other a movement additional to that caused by the actuating connections.

5. In a totalizer, the combination with a plurality of registering wheels, of actuating means therefor, and transfer devices controlled by each of said wheels for giving the other a movement additional to that caused by the actuating connections.

6. In a totalizer, the combination with a plurality of movable elements, of actuating means therefor, a differentially movable transfer device between said elements, and means for controlling the differential movement of said device.

7. In a totalizer, the combination with a plurality of movable elements, of actuating means therefor, and a differentially movable transfer device between said elements, the differential movement of said device being controlled by one of the elements.

8. In a totalizer, the combination with a plurality of registering wheels, of a transfer device having a plurality of actuators one for each wheel, a movable device for rendering all but one of said actuators inoperative, and means carried by the wheel with which the operative actuator engages for rendering all of said actuators operative.

9. In a totalizer, the combination with a plurality of movable elements, of actuating means therefor, spring controlled transfer devices between said elements, and means for first putting all the springs under tension and then successively releasing them at each operation of said actuating means to effect the transfer.

10. In a totalizer, the combination with a plurality of movable elements, of actuating means therefor, spring controlled transfer devices between said elements, pawls for holding the transfer devices under spring tension, and means for first putting all the springs under tension and then successively releasing them at each operation of said actuating means to effect the transfer.

11. In a totalizer, the combination with a plurality of registering wheels, of actuating means therefor, two part transfer levers between said wheels, springs interposed between said parts, means for compressing said springs, pawls for holding half of the parts while the other half are being moved to compress the springs, and cams for successively operating the pawls to release the parts held thereby to effect the transfer.

12. In a totalizer, the combination with a plurality of movable elements, of a plurality of transfer devices for one of said elements controlled by the elements of the next higher and lower denominations.

13. In a totalizer, the combination with a plurality of movable elements, of transfer devices between said elements, one of said devices being controlled by a plurality of said elements.

14. In a totalizer, the combination with a totalizing element, of operating devices for the same, and an additional device for actuating said element, with means moved by the element for partly controlling said additional device.

15. In a totalizer adapted for non-decimal denominational ratios, the combination with totalizer elements of lower and higher orders, of transfer mechanism for the element of higher order, and means for automatically giving a movement to the totalizer element of lower order each time the said transfer mechanism actuates the element of higher order.

16. In a totalizer adapted for non-decimal denominational ratios, the combination with totalizer elements of lower and higher orders, of transfer mechanism for said element of higher order, and means for automatically giving said element of lower order a movement each time the transfer mechanism actuates the element of higher order, with means operated by said element of lower order for controlling its said movement.

17. In a totalizer adapted for non-decimal denominational ratios, the combination with totalizer elements of lower and higher orders, of transfer mechanism for the element of higher order, and means for automatically giving a multiple movement to the element of lower order each time the said transfer mechanism actuates the element of higher order.

18. In a totalizer adapted for non-decimal denominational ratios, the combination with totalizer elements of lower and higher orders, of transfer mechanism for the element of higher order controlled by the elements of lower orders, and means for automatically giving a multiple erasing movement to an element of lower order each time the transfer mechanism actuates the element of higher order.

19. In a totalizer adapted for non-decimal denominational ratios, the combination with two totalizer elements, and means for actuating them to desired extents, of means for giving a multiple erasing movement to one of said elements after a predetermined extent of movement has been given to either or both of said totalizer elements.

20. In a totalizer adapted for non-decimal denominational ratios, the combination with two totalizer elements, and means for actuating them to desired extents, of means for causing a multiple erasing movement to be given one of said elements each time a predetermined value has been added to said totalizer elements collectively.

21. In a totalizer adapted for non-decimal denominational ratios, the combination with two totalizer elements, and means for actuating them to desired extents, of means controlled by both said elements for giving one of them a multiple erasing movement each time a predetermined value has been added to either or both of said elements.

22. In a machine of the class described the combination with accumulating wheels and means for individually actuating the same; of carrying mechanism associated with each of two adjacent wheels to advance the same, the wheel of higher order adapted to carry to the wheel of lower order.

23. In a machine of the class described the combination with accumulating wheels and means for individually actuating the same; of carrying mechanism associated with each of two adjacent wheels to advance the same each wheel adapted to carry to the other.

24. In a machine of the class described the combination with accumulating wheels and means for individually actuating the same; of carrying mechanism associated with each of two adjacent wheels to advance the same, the wheel of higher order adapted to carry to the wheel of lower order a multiple increment of movement.

25. In a machine of the class described the combination with accumulating wheels and means for individually actuating the same; of carrying mechanism associated with each of two adjacent wheels to advance the same, one wheel adapted to carry to the other a multiple increment of movement and that other adapted to carry to the first single increments of movement.

26. In a machine of the class described the combination with accumulating wheels and means for individually actuating the same; of carrying mechanism associated with each of two adjacent wheels to advance the same, each wheel adapted to carry to the other a multiple increment of movement.

27. In a machine of the class described the combination with accumulating wheels and means for individually actuating the same; of carrying mechanism associated with each of two adjacent wheels to advance the same, the wheel of higher order adapted to carry to the wheel of lower order and the latter adapted to carry to the wheel of higher order single or double increments of movement.

28. In a machine of the class described the combination with accumulating wheeels and means for individually actuating the same; of carrying mechanism associated with each of two adjacent wheels to advance the same, the wheel of higher order adapted to carry to the wheel of lower order a multiple increment of movement and the latter adapted to carry to the wheel of higher order single or double increments of movement.

29. In a machine of the class described the combination with accumulating wheels and means for individually actuating the same; of duplex carrying mechanism controlled by one wheel and adapted to effect a multiple increment of movement of the adjacent wheel, and carrying mechanism controlled by the latter and adapted to effect advance movement of the first mentioned wheel.

30. In a machine of the class described the combination with accumulating wheels and means for individually actuating the same; of duplex carrying mechanism controlled by one wheel and adapted to effect a multiple increment of movement of the adjacent wheel, and carrying mechanism controlled by the latter and adapted to effect a double increment of movement of the first-mentioned wheel.

In testimony whereof I affix my signature in the presence of two witnesses.

JOSEPH P. CLEAL.

Witnesses:
D. S. TOVELL,
E. MERNER.

Correction in Letters Patent No. 1,128,409.

It is hereby certified that in Letters Patent No. 1,128,409, granted February 16, 1915, upon the application of Joseph P. Cleal, of Toronto, Ontario, Canada, for an improvement in "Cash-Registers," an error appears in the printed specification requiring correction as follows: Page 11, lines 31-33, strike out the words "giving the other a movement additional to that caused by the actuating connections" and insert the words *operating the other;* and that the said Letters Patent should be read with this correction therein that the same may conform to the record of the case in the Patent Office.

Signed and sealed this 30th day of March, A. D., 1915.

[SEAL.]

J. T. NEWTON,
*Acting Commissioner of Patents.*